United States Patent
Hill et al.

(10) Patent No.: US 6,453,321 B1
(45) Date of Patent: Sep. 17, 2002

(54) STRUCTURED CACHE FOR PERSISTENT OBJECTS

(75) Inventors: Justin H. Hill, Durham; Timo J. Salo, Apex, both of NC (US)

(73) Assignee: IBM Corporation, Armonk, NY (US)

( * ) Notice: Subject to any disclaimer, the term of this patent is extended or adjusted under 35 U.S.C. 154(b) by 0 days.

(21) Appl. No.: 09/248,561

(22) Filed: Feb. 11, 1999

(51) Int. Cl.$^7$ ............................................... G06F 17/30
(52) U.S. Cl. ............................ 707/103; 707/1; 707/2; 707/3; 707/4
(58) Field of Search .................... 707/103, 3, 1, 707/2, 4

(56) References Cited

U.S. PATENT DOCUMENTS

| | | | | |
|---|---|---|---|---|
| 5,706,506 A | * | 1/1998 | Jensen et al. | 707/103 |
| 5,806,068 A | * | 9/1998 | Shaw et al. | 707/103 |
| 5,822,749 A | * | 10/1998 | Agarwal | 707/2 |
| 5,907,846 A | * | 5/1999 | Berner et al. | 707/103 |
| 6,035,303 A | * | 3/2000 | Baer et al. | 707/103 |
| 6,070,165 A | * | 5/2000 | Whitmore | 707/101 |
| 6,128,623 A | * | 10/2000 | Mattis et al. | 707/103 |
| 6,128,627 A | * | 10/2000 | Mattis et al. | 707/202 |
| 6,295,580 B1 | * | 9/2001 | Sturges et al. | 711/129 |
| 6,304,879 B1 | * | 10/2001 | Sobeski et al. | 707/103 |

* cited by examiner

*Primary Examiner*—John Breene
*Assistant Examiner*—Debbie M Le

(57) ABSTRACT

A technique for creating and using a structured cache to increase the efficiency of reading persistent objects from a database. The structured cache is comprised of an object cache, an associations cache, and a data cache. Data read-ahead is used to retrieve rows from a relational database in advance of an application's need for the data. Entries are created in the data cache and association cache as the rows are processed. The data cache stores data in unstructured binary format, delaying the expense of instantiation until an object is requested by the application. At that time, data is retrieved from the data cache, an object is instantiated from the data, and an entry is created in the object cache. This approach also saves storage space that would be wasted if objects were instantiated upon retrieval, but never used. The association cache stores members of an association, organized by member key within owner key for each association. According to the preferred embodiment, maintaining cache consistency is not required, further increasing the efficiency gains that can be realized using this technique.

34 Claims, 11 Drawing Sheets

FIG. 3A
Employee table

| | Employee Number 305 | Employee Name 306 | Department Number 307 | Project Number 308 |
|---|---|---|---|---|
| 301 | 00010 | Jane Doe | D01 | AD3100 |
| 302 | 00050 | John Doe | D01 | MA2100 |
| 303 | 00100 | John Q Public | E01 | OP2010 |
| 304 | 00320 | Mary Doe | D01 | MA2100 |

300

FIG. 3B
Department table

| | Department Number 335 | Manager Number 336 | Department Name 337 |
|---|---|---|---|
| 331 | D01 | 00010 | Development |
| | E01 | 00010 | Administration |
| | E21 | 00320 | Support |
| | E31 | 00070 | Operations |

330

FIG. 3C
Project table

| | Project Number 365 | Project Name 366 |
|---|---|---|
| 361 | AD3100 | Admin Serv |
| 362 | MA2100 | Weld Line A |
| | OP2000 | Gen Sys Ser |
| | OP2010 | Sys Support |

360

Object Cache Structure

Data Cache Structure

Association Cache Structure

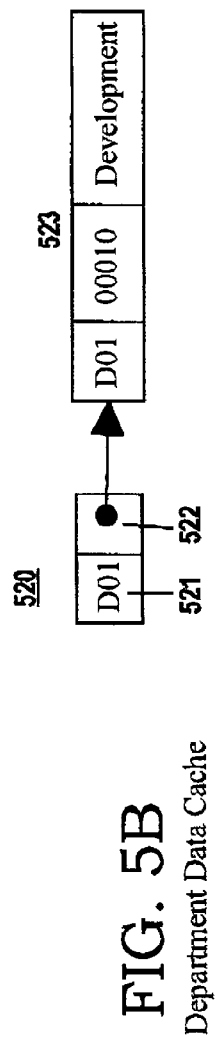
FIG. 5A
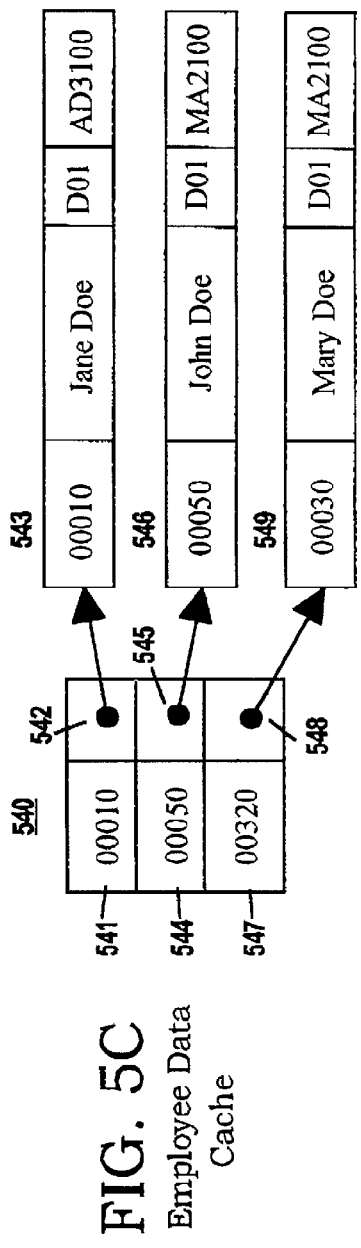
FIG. 5B
Department Data Cache
FIG. 5C
Employee Data Cache Project Data Cache Association Cache

STRUCTURED CACHE FOR PERSISTENT OBJECTS

BACKGROUND OF THE INVENTION

1. Field of the Invention

The present invention relates to the field of computer programming, and more particularly to a method, system, and computer readable code for creating and using a structured cache to increase the efficiency of reading persistent objects from a database.

2. Description of the Related Art

Caching is a technique known in the computer programming art for increasing the speed of data retrieval. It involves storing data in an easily-accessible location from which it can be quickly retrieved. Read-ahead is another technique known in the art, whereby a prediction is made as to which data will be needed by a software application: that data is then retrieved in advance. When the prediction has been accurately made, the data will be available at the time the application needs it and the application will not have to wait while a retrieval operation takes place. Typically, the data that is read ahead is the "working set", where a working set is the set of data that the application is using at a point in time.

In object-oriented programming, the working set is the set of objects the application is using. An application may consist of multiple tasks, and each task may have its own working set. For example, suppose an application uses Employee objects as well as Department objects and Project objects for those employees. An employee may change from one department to another, necessitating a change to his existing stored data. To perform this change-department task, a user of the application will typically retrieve the employee object for this employee, and then retrieve the employee's department object. The working set for this task therefore comprises objects from the Employee and Department classes. Suppose an employee may be assigned to work on zero or more projects at any given time, and a manager wishes to obtain a list of all the projects to which his employees are assigned. This project-inquiry task involves retrieving each employee object and zero or more project objects for each one, but would not is likely require any department objects to be accessed. Thus, for this task, the working set comprises objects from the Employee and Project classes.

When objects are persisted using a relational database, the various classes of objects typically correspond to separate tables in the database. For the example application discussed above, the database would contain tables for Employee, Department, and Project data. Each employee then has a row in the Employee table, a row in the Department table (assuming each employee is assigned to a single department), and zero or more rows in the Project table. The application retrieves data from these tables by issuing a database query. It may take a considerable amount of time, relative to the overall processing time of a task, to complete a database query operation. The query operation involves multiple components of the computer system. After the application issues the query, the operating system may be involved, after which the database system receives the query (and possibly reformats it), locates the requested rows from the table or tables, formats the rows into a message to be returned to the application, and contacts the operating system with this result message. The message is then received by the requesting application, which can then begin to process the data. When the database is remotely located, such as in a network computing environment, the time required to complete the query is increased by the time required for the communication over the network to occur between the client machine and the database server (including the possibility of communications over intermediate connections between the client and database server). Thus, it can be seen that issuing a database query is an expensive operation in terms of elapsed time.

When a client machine and database server are connected in a local-area network (LAN) environment, it has been demonstrated that the amount of data sent from the server to the client in response to a database query has relatively limited influence on the overall processing cost of data retrieval. Instead, the access operation itself accounts for the majority of the processing time and thus forms the processing bottleneck. When the client and server are connected in a wide-area network (WAN), the amount of data transmitted does influence the data retrieval cost, but the access operation continues to account for a significant portion of the cost. In both environments, the overall efficiency of the system can be increased by retrieving as much of the working set as possible during each retrieval operation, with a larger efficiency gain being realized in the LAN environment. This is where the read-ahead operation comes into play: if a database retrieval is required for one object that an application requires access to, it is more efficient to retrieve additional objects at the same time—assuming, of course, that the objects retrieved in the read-ahead are those that will actually be used by the application in its subsequent operations.

When used together, read-ahead and caching techniques can dramatically improve the efficiency and flexibility of an executing application. The read-ahead operation retrieves data in advance of when the application is ready to access it, and caching stores the retrieved data in a location from which it can be quickly accessed when it is needed. In an application that does not use read-ahead and caching, the application is always starved for data, reading one object at a time from the data source as further data is needed. When the underlying object model of the application has many associations from one class to another (and therefore many relationships between tables in the database), traversing this model's associations as the application user navigates the model to perform various tasks will typically require access to many objects. When each object is retrieved from the database one at a time, a large number of expensive database round trips will likely be required. This may lead to processing delays that are unacceptable to the application user.

A read-ahead scheme allows the application to minimize the number of database round trips, and therefore reduce the processing delays in the application. How far to read ahead, and which objects to retrieve during a read-ahead operation, is determined by the requirements of a particular application and is the subject of ongoing research in the industry. The application developer will code the database query commands to retrieve the data that he expects will most likely be needed next as the application executes. A single query command can be used to retrieve large object composition trees (i.e. multiple objects, having interrelationships that form a hierarchically-structured tree).

Reading ahead may result in too much data. Suppose, for example, that the application user begins a task for which the database query retrieves a particular employee's information (from the Employee table) as well as information about the department he works in (from the Department table) and the project he works on (from the Project table). If the user ends up working with only one Employee, perhaps to change the employee's marital status, then only a small percentage of the data from the read-ahead is actually used by the task. Reading ahead requires storage space to store the retrieved data and processing cost of transforming the data from its relational database format (i.e. a row from a table) into an object format—that is, instantiating the retrieved data. In some situations, the data retrieved for a single object may result in multiple objects when instantiation occurs. Especially in component-based systems such as Enterprise JavaBeans, the ratio of instantiated objects to retrieved objects can be as high as 5 to 1, due to all the required helper objects that will be created. ("JavaBeans" is a trademark of Sun Microsystems, Inc.) When the data that is read ahead of the application's requirement for it is in fact used by the application, then these storage and instantiation costs are justified. If, however, the read-ahead prediction was not totally accurate (as is very likely), then the cost of storing and instantiating the extra data (i.e. the data that was retrieved but not actually required by the application) is wasted. As will be obvious, as the percentage of storage and instantiation costs attributable to this extra data increases, there is a corresponding decrease in the efficiency gain that can be achieved by reading ahead. At the same time, it is generally desirable to attempt to read as much data as possible with each query command, in order to reduce the number of roundtrips to the database that will be required.

In addition to the problem of reading too much data, reading ahead may retrieve data that is needed by a task, but in a form that prevents the task from accessing it. This occurs when a database query retrieves data according to a particular defined access path, but the user wants to navigate the data in a different order. For example, suppose the query retrieves data beginning from the Department table, which is linked to the Employee table, which is further linked to the Project table (such as retrieving all employees within a department, and the project each works on). The user, on the other hand, wishes to navigate this data beginning with information from the Project table (locating all the employees who work on a particular project, perhaps). When navigation of the working set is restricted to using the order defined in the query, any alternative navigation paths that the user wishes to use will require additional roundtrips to the database to retrieve the data in a different order that is appropriate for the alternative navigation path.

Accordingly, what is needed is a technique whereby the costs involved with read-ahead data retrieval can be minimized, enabling the cost of storing and processing unused data to also be minimized, and whereby the retrieval order used for a database access will not limit the navigation order of the corresponding objects. The present invention addresses this problem by providing a technique for creating and using a structured cache to increase the efficiency of reading persistent objects from a database.

SUMMARY OF THE INVENTION

An object of the present invention is to provide a technique for creating a structured cache to store data retrieved using read-ahead operations.

Another object of the present invention is to provide this technique where the source of the retrieved data is a relational database, and where the destination of the data is an application written using an object-oriented programming language.

A further object of the present invention is to provide this structured cache technique such that data can be efficiently retrieved therefrom when needed.

Yet another object of the present invention is to provide this technique in a manner that does not require cache consistency maintenance procedures.

Still another object of the present invention is to provide a technique that enables object navigation to be independent of the data access path used on the query that retrieves the data.

A further object of the present invention is to provide a technique that maintains the information about relationships between entities that are retrieved from the database.

Yet another object of the present invention is to provide a technique that stores cached entries in an optimized form, reducing storage space and resource requirements.

Still another object of the present invention is to provide a technique that restructures a result set of a database query according to a corresponding object model.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a method, system, and computer-readable code for increasing efficiency of reading persistent objects from a database by creating and using a structured cache in a computer system. In one aspect, this technique comprises: retrieving a result set from said database in response to a database query, said result set comprising one or more rows of data elements; creating a data cache from said retrieved result set; and creating an associations cache from said retrieved result set.

In another aspect, this technique comprises: retrieving a result set from said database in response to a database query, said result set comprising one or more rows of data elements; creating a data cache from said retrieved result set; and responding to a request for access to an object by an executing program in said computer system, comprising: locating an entry corresponding to said object in said data cache; instantiating and hydrating said object from said located entry; registering said instantiated and hydrated object in an object cache; and returning said instantiated and hydrated object to said executing program. This aspect may further comprise creating an associations cache from said retrieved result set. The responding to a request for access may operate only for an initial request for access to said object, where responding to subsequent requests for access to said object comprises: locating said requested object in said object cache using said register; and returning said located object to said executing program.

In yet another aspect, this technique comprises: retrieving a result set from said database in response to a database query, said result set comprising one or more rows of data elements; creating a data cache from said retrieved result set; and creating an object cache entry for an object corresponding to data stored in said data cache, comprising: locating an entry corresponding to said stored data in said data cache; instantiating and hydrating said object from said located entry; and registering said instantiated and hydrated object in said object cache by creating said object cache entry. This aspect may further comprise creating an associations cache from said retrieved result set. The retrieving a selected object from said structured cache may further comprise: searching said object cache for said selected object using a result of said registering; returning said selected object if searching said object cache locates said selected object; searching said data cache for said entry corresponding to said selected object if searching said object cache fails to locate said selected object; wherein said creating an object cache entry is invoked if searching said data cache locates said entry; and issuing a further database query if searching said data cache fails to locate said entry. When said associations cache was created, this technique may further comprise navigating associations represented by said result set using said associations cache, in response to a request for one or more member objects of a selected association, comprising: searching said associations cache to locate a member key collection corresponding to said selected association, said member key collection comprised of one or more member primary keys; retrieving said member key collection from said database by issuing a second database query if said searching fails to locate said member key collection in said associations cache; locating each member object associated with said member key collection in said associations cache if said searching locates said member key collection; and returning said located member objects as a response to said first request. Preferably, creating a data cache further comprises: extracting a primary key for each object in each row of said result set; extracting corresponding data for each object from said row if said primary key does not already exist in said data cache; and storing said extracted primary key and said extracted corresponding data as said entry corresponding to said object in said data cache. Access to said data cache preferably uses a data cache look-up table, wherein said data cache look-up table is comprised of a collection of said stored primary keys and, for each of said stored primary keys, a corresponding pointer to said stored extracted corresponding data. Creating an associations cache may further comprise: defining one or more association types for said associations cache; storing association cache entries corresponding to said defined association types; and populating said associations cache, further comprising: extracting zero or more foreign keys for each object in each row of said result set; storing each extracted foreign key as an owner key, said owner key being associated with a particular one of said stored association cache entries and being unique within said particular one; and storing a member primary key corresponding to each extracted foreign key, said member primary key being associated with a particular one of said stored owner keys. Access to said associations cache preferably uses an associations cache look-up table, wherein said associations cache look-up table is comprised of a collection of said stored association cache entries, said stored owner keys, and said stored member primary keys, organized according to said stored member primary keys within said stored owner keys within said stored association cache entries. Access to said object cache preferably uses an object cache look-up table, wherein said object cache look-up table is comprised of a collection of object identifiers, one of said object identifiers corresponding to each of said registered objects, wherein said object cache look-up table is organized according to said object identifiers.

In a further aspect, the present invention provides a method, system, and computer-readable code for enabling object navigation to be independent of a data access path used on a query that retrieves data from a database, comprising: creating an associations cache, wherein said associations cache comprises an entry for each association in said retrieved data; and retrieving one or more member objects of a selected one of said associations from said created associations cache.

The present invention will now be described with reference to the following drawings, in which like reference numbers denote the same element throughout.

DESCRIPTION OF THE DRAWINGS

FIG. 3 shows a simple example of data values stored in relational database tables, according to the prior art;

DESCRIPTION OF THE PREFERRED EMBODIMENT

Figure 1:
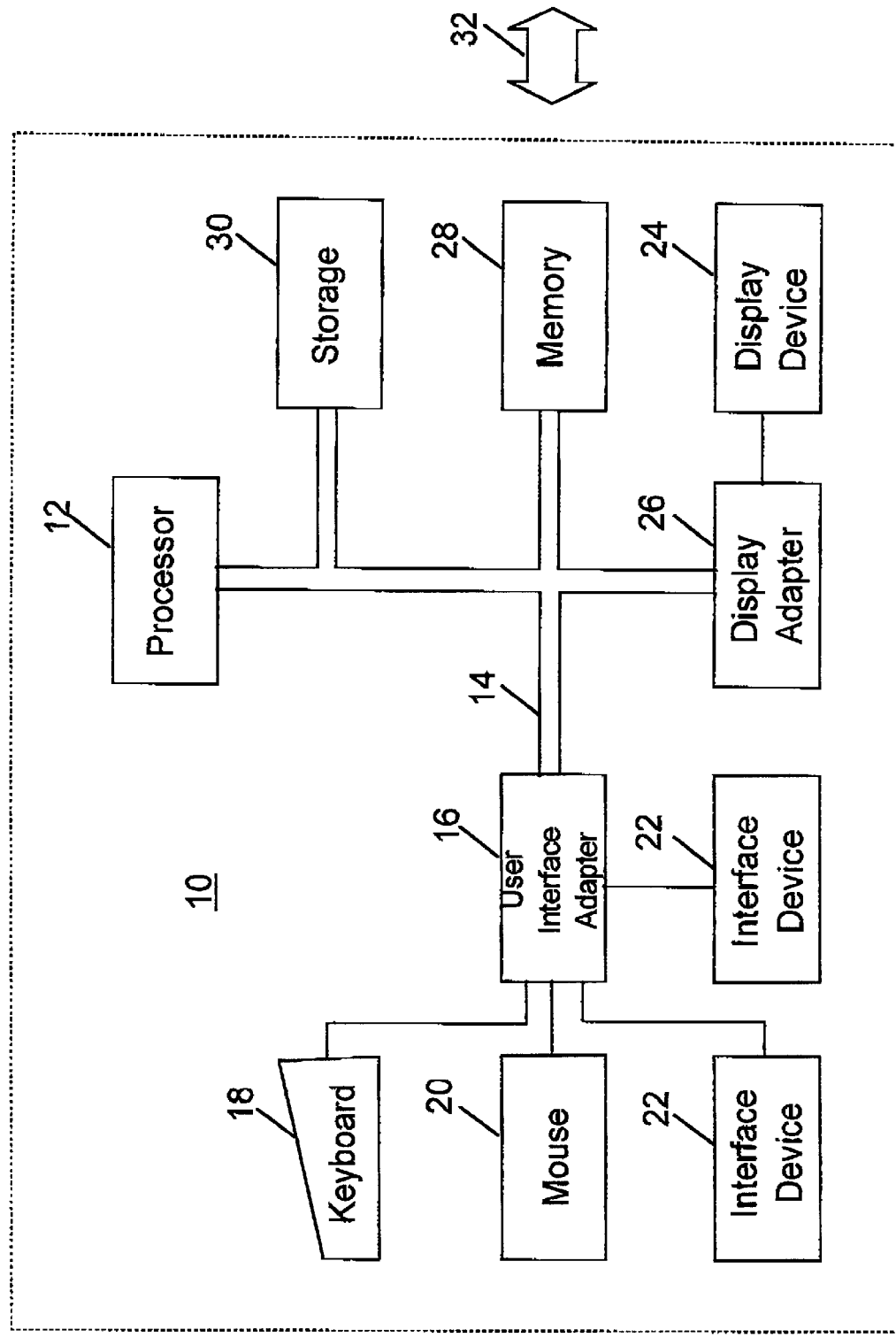
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a LAN or a WAN, or the workstation 10 can be a client in a client/server arrangement with another computer, etc. All of these configurations, as well as the appropriate communications hardware and software, are known in the art.

Figure 2:
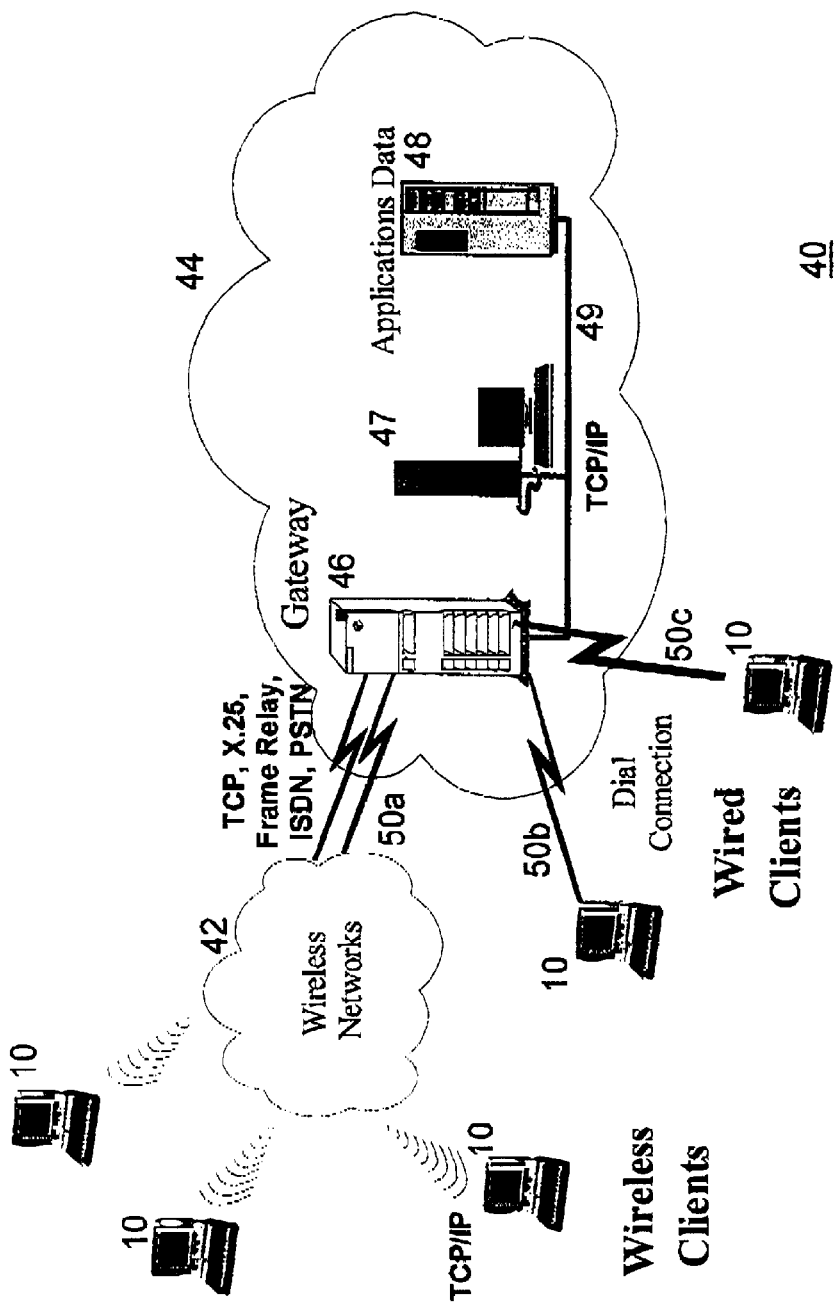
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from the International Business Machines Corporation ("IBM"), an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 of the workstation 10 or server 47 from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory on physical media, and/or distributing software code via networks are well known and will not be further discussed herein.

A user of the present invention may connect his computer to a server using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computer may be any type of computer processor, including laptop, handheld or mobile computers; vehicle-mounted devices; desktop computers; mainframe computers; etc., having processing and communication capabilities. The remote server, similarly, can be one of any number of different types of computer which have processing and communication capabilities. These techniques are well known in the art, and the hardware devices and software which enable their use are readily available. Hereinafter, the user's computer will be referred to equivalently as a "workstation", "device", or "computer", and use of any of these terms or the term "server" refers to any of the types of computing devices described above.

The computing environment in which the present invention may be used includes an Internet environment, an intranet environment, an extranet environment, or any other type of networking environment. These environments may be structured using a client-server architecture, or a multi-tiered architecture, whereby a client-server environment is extended by adding data repositories as an additional tier (such that one or more servers now occupy the tiers in the middle), and where these data repositories contain information that may be accessed by the server as part of the task of processing the client's request.

The preferred embodiment of the present invention will now be discussed with reference to FIGS. 3 through 8.

In the preferred embodiment, the present invention is implemented as a computer software program. The program code of the preferred embodiment is implemented as objects (classes and methods) in the Java object-oriented programming language. ("Java" is a trademark of Sun Microsystems, Inc.) However, the inventive concepts disclosed herein may be used advantageously with other programming languages, whether object-oriented or procedural. The program implementing the present invention will be used where a read-ahead scheme is implemented to retrieve data from a database before it has been requested by an executing application.

A Java development environment typically includes class libraries for use by developers when programming (i.e. developing applications) in the Java language. Class libraries are reusable sets of reusable classes which typically provide relatively high level functionality. A class is one of the basic building blocks of object-oriented languages such as Java, and comprises code which represents a combination of logic function and data. An object is an instance of a class. These concepts and techniques of Java programming are well known, and will not be discussed in depth herein.

The concept of a persistent store is well known to those skilled in the art, and will not be described in detail herein. In a client/server or multi-tiered environment, a persistent store of objects may be maintained in one or more locations which are accessible by applications (and their users) in the computing environment, such as one or more common databases. Such databases may be maintained in, for example, the data repository 48 of FIG. 3 or the long term storage 30 of FIG. 1.

FIG. 3 illustrates a simple example of data values stored in relational database tables, according to the prior art. For this example, which has been briefly discussed earlier herein, the tables of interest are Employee 300, Department 330, and Project 360 tables. Each row 301, 302, 303, 304 in the Employee table 300 contains information for a single employee. The Employee table 300 is organized by employee number 305, which serves as the primary key for accessing the table and therefore is a unique element of each row. In this example, each row also has fields (illustrated as columns) for the employee's name 306, department number 307, and project number 308. The department number field 307 is a foreign key in this example, linking each employee row with the row from the Department table 330 representing the department in which this employee works. The project number 308 is also a foreign key, linking an employee row with a row from the Project table 360. (It will be obvious to one of ordinary skill in the art that the tables used in FIG. 3 have been simplified to illustrate the present invention, and that tables used for actual applications will typically have many more fields and many more rows than those shown in FIG. 3.)

The Department table 330 uses department number 335 as its primary key. Additional fields of this table are the manager number 336 and department name 337. The manager number 336 is a foreign key, identifying the row from the Employee table 300 that contains information for the employee who is the manager of this department. The Project table 360 uses the project number 365 as its primary key. It further contains a field for the project name 366.

Figure 4A:
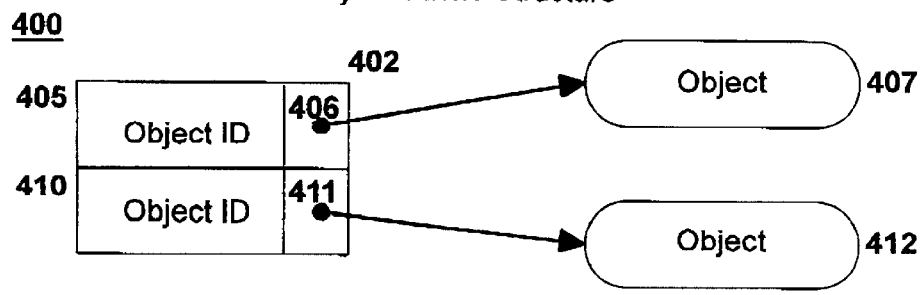
FIG. 4 illustrates the format of a structured cache, in accordance with the present invention.
Figure 4B:
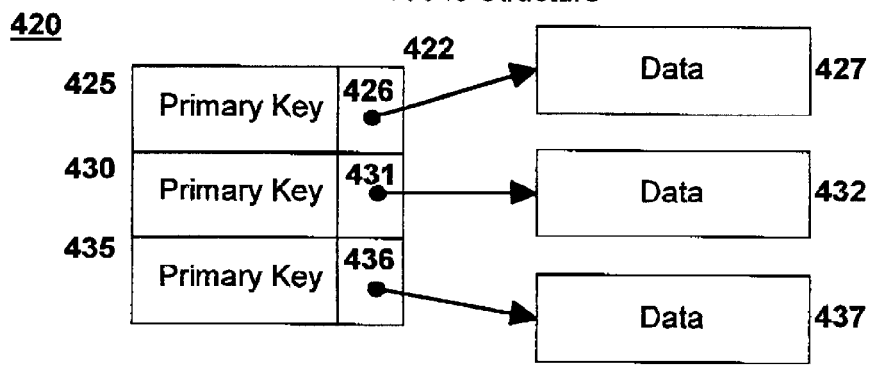
Figure 4C:
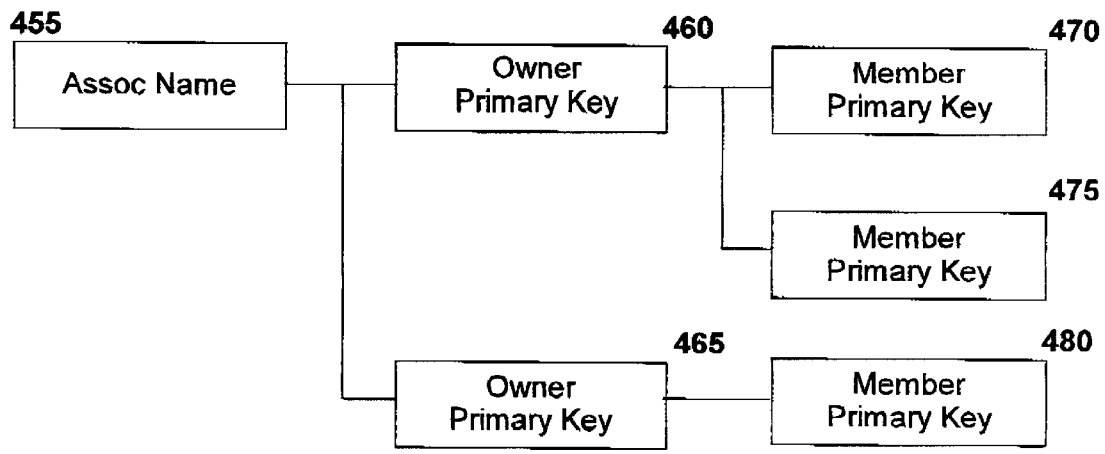

FIG. 4 illustrates the format of a structured cache as defined by the present invention. The cache comprises 3 components: an object cache (the format of which is depicted in FIG. 4A); a data cache (shown in FIG. 4B); and an association cache (shown in FIG. 4C). As stated earlier, reading objects ahead often results in retrieval of a large amount of data, some of which will not be used by an application. Instantiating the objects represented by the retrieved data, and storing them in the cache, is expensive in terms of processing time and space. Therefore, the present invention stores the retrieved data into the data cache in an unstructured binary format. This reduces the amount of space required for storing the data (as opposed to storing it in object format). In situations where multiple objects are generated during instantiation, as discussed earlier, even more space is saved by using this approach. Reducing the storage space results in fewer memory allocation problems as the application executes, and reduces the time the runtime environment spends performing garbage collection. In addition, the present invention only instantiates objects (that is, creates a formatted object from the stored binary data) when the application program requires a particular object. By delaying the processing cost of instantiating objects until it is known that the application will use the object, processing efficiency is increased due to not instantiating objects that end up never being referenced. The efficiency in reading persistent objects that is gained from using the structured cache of the present invention makes it feasible for an executing task to attempt to retrieve most of its working set (e.g. by using a database command having a relational join operation, discussed below with reference to FIG. 5) with a single roundtrip to the database.

The present invention uses a 2-stage approach to instantiating persistent objects from the retrieved data, and uses the data cache and object cache to perform this staging. In the first stage, the data retrieved from the database is brought into the data cache (FIG. 4B) and stored. The data remains here until the executing application requires access to it. At that time, the second stage of instantiation occurs, whereby the data from the data cache pertaining to the desired object is extracted and used to create the instantiated object. Each instantiated object is stored in the object cache (FIG. 4A). Subsequent references to this object by the application will locate the object in the object cache. (The process with which the structured cache is populated, and with which data stored in each component of the cache is located, is described in detail below with reference to FIGS. 6 though 8.)

The association cache (FIG. 4C) extends the caching scheme to include the relationship semantics of the underlying database. Relationships between tables in the database correspond to associations between objects in the object model. An application user will typically navigate the object model using these associations. For example, if the detailed information for an employee is currently being displayed in an application window, the user may decide to display a window containing information about this employee's department, which requires the application to navigate an association between employees and departments. Or, the user may decide to view the project this employee works on, which requires navigating an association between employees and projects. While association information is an integral part of an object model, database queries have fixed access paths (such as finding the row having a specified primary key, or finding all rows which contain a specified foreign key, etc.). These data access paths in the database will often be different from the object model navigation order. The novel association cache of the present invention enables the data stored in the data cache to be accessed dynamically in accordance with any access paths that were defined and represented in the underlying database. In the case of relational databases, this means that the foreign key references are extracted from the data retrieved from the database and used to create the association cache component of the structured data cache. (FIGS. 6 and 8 describe in detail how the association cache is populated, and how it is used to retrieve the member objects of an association.)

Maintaining a separate cache for associations as defined by the present invention enables locating association members much more quickly than attempting to read the entire data or object cache, which would require looking for the desired owner key in the foreign key values of each element—potentially a very expensive operation. Further, it enables traversing the object model in navigation paths that are independent from the order of relations used in the query command that retrieved the data. Because the navigation path is made independent from the query retrieval order, the developer can code a query in the application that will preload data, using a read-ahead operation, that he expects the task will need—without having to be concerned about what order to use for the retrieval. These advantages of the association cache will be discussed in more detail below for FIG. 5E, with reference to an example query and its resulting cached data.

Returning now to FIG. 4, the format of the components of the structured cache will now be described in more detail. The object cache 400 includes an index 402 or lookup table that is used to locate individual objects. As each object is instantiated, its object identifier is registered in this index. FIG. 4A shows an object cache having two objects 407 and 412. The cache index 402 stores entries comprising object identifiers (here, identifiers 405 and 410) for each stored object as well as a pointer (shown in this example as elements 406 and 411) to where the corresponding object is stored. (Obviously, additional tuples of object identifier and pointer would be added to the index to represent each additional instantiated object. Two tuples are shown in FIG. 4A merely to illustrate the structure of the object cache and its index.) In the preferred embodiment, a separate object index is used for objects of each object class. When the underlying database is a relational database, the object identifier is the primary key used for the table that corresponds to this object class. According to our example, for an object cache used to store Employee objects, the index 402 would therefore contain employee numbers (the primary key of the Employee table) in the locations for object identifiers shown as 405 and 410. These object identifiers then point 406, 411 to employee objects 407, 412. The Department objects would be stored in a similar but logically separate object cache, having its own cache index which would use department numbers as object identifiers. Similarly, the cache index for the Project objects would use project numbers as object identifiers. A top-level index (not shown) may then be used to represent the entire object cache for all classes of objects. The entries in this top-level index are the class name of each individual class object cache (such as Employee) and a pointer to where the index for each corresponding class is stored.

The data cache 420 shown in FIG. 4B stores data in binary format after it is retrieved from the database, as stated previously. The data cache is organized by object class and primary key, using the approach described above for the object cache. However, the primary keys (shown as elements 425, 430, 435) point 426, 431, 436 to the binary data 427, 432, 437 of the data cache instead of to instantiated objects of the object cache.

The association cache 450 shown in FIG. 4C comprises an entry for each association 455 used by the application as it traverses the object model. While only one association 455 has been shown in FIG. 4C, many associations may be contained in an association cache, and each will have the structure shown in this figure. Each association has an associated collection identifying the owner objects. For a relational database, the owner's primary key is used to identify each owner object. FIG. 4C illustrates an association 455 having two owner objects 460, 465. Each owner primary key corresponds to a member's foreign key, for a collection of member objects. Here, owner object 460 has two member objects 470 and 475, while owner object 465 has a single member object 480.

FIG. 5 illustrates a simple example of a populated structured cache, resulting from a single database query command, in accordance with the present invention. Assuming the database contents are those shown in FIG. 3, the query command that retrieves all employees who work in department D01 and the project for each employee returns the data represented by the rows shown in FIG. 5A. In the Structured Query Language (SQL), this query command may be formatted as "SELECT*FROM Department, Employee, Project WHERE Department.DeptNo='D01' AND Department.DeptNo=Employee.DeptNo AND Employee.ProjNo=Project.ProjNo". (Note that if the possibility exists for employees to not be assigned to a project, then this equi-join operation would omit those employees from the result set. To avoid this, and create a result set where the employee is represented without corresponding information from the project table, a left outer join operation should be used instead of an equi-join when joining employees and projects. These techniques are well known to those of skill in the art.) One department 331 exists in the Department table 330 satisfying this primary key equal to "D01" requirement, and three employees 301, 302, 304 in the Employee table 300 have this department number in the foreign key field 307. Two projects 361, 362 in the Project table 360 are referenced from these three employees through the foreign key field 308. As will be obvious to one of ordinary skill in the art, the result of the above join operation therefore yields 3 rows, and these rows have the content shown in FIG. 5A.

Figure 5D:
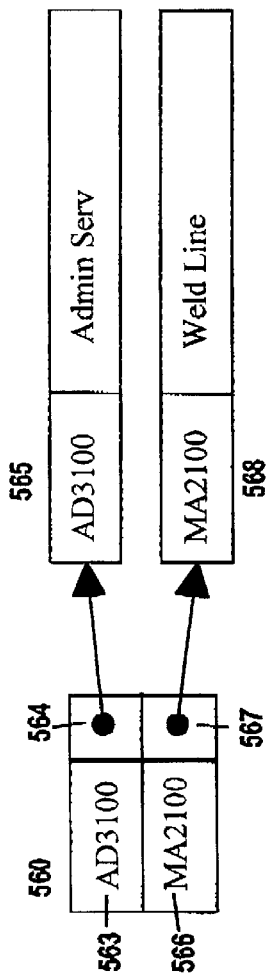
FIG. 5 illustrates a simple example of a populated structured cache, resulting from a single database query command, in accordance with the present invention.

FIGS. 5B through 5D show the data cache that results from processing the rows in FIG. 5A, according to the present invention. The Department data cache (FIG. 5B) contains a single entry, since the data in the 3 rows returned from the query command all pertained to the same department D01. The logic with which the data cache is populated (see FIG. 6B) avoids creating redundant entries in the cache. The data cache index 520 contains an entry 521 having the department D01 primary key and a pointer 522 to the data 523 stored for this department. (Note that while the data values in FIG. 5, such as data 523, are shown in a human-readable format, this is for purposes of illustration only. The actual data stored in the data cache is stored in binary format, as has been previously discussed.) Similarly, the Employee data cache in FIG. 5C contains entries for the three employees represented in the 3 returned rows, and the data cache index 540 has entries 541, 544, 547 containing the three employee primary key values (00010, 00050, and 00320) and pointers 542, 545, 548 to the data 543, 546, 549 stored for these if employees (in binary format). Finally, a Project data cache (FIG. 5D) is created to represent the third type of data represented in the returned rows. This data cache contains two entries, representing the two projects from the returned data rows. The cache index 560 has entries 563, 566 for each project number primary key and pointers 564, 567 to the stored project data 565, 568 for these two projects.

Objects are not instantiated from data returned in rows (illustrated by FIG. 5A) but instead are instantiated from the data cache (see FIGS. 5B through 5D) when the executing application requests access to an object, as has been discussed. The structure into which an object is instantiated depends upon a particular object model being used with an application, and thus a populated object cache is not illustrated. It will be obvious to one of ordinary skill in the art, referring to the structures shown in FIGS. 4A and 4B, that a populated object cache index will be identical in format to the data cache indices shown in FIGS. 5B through 5D.

Figure 5E:
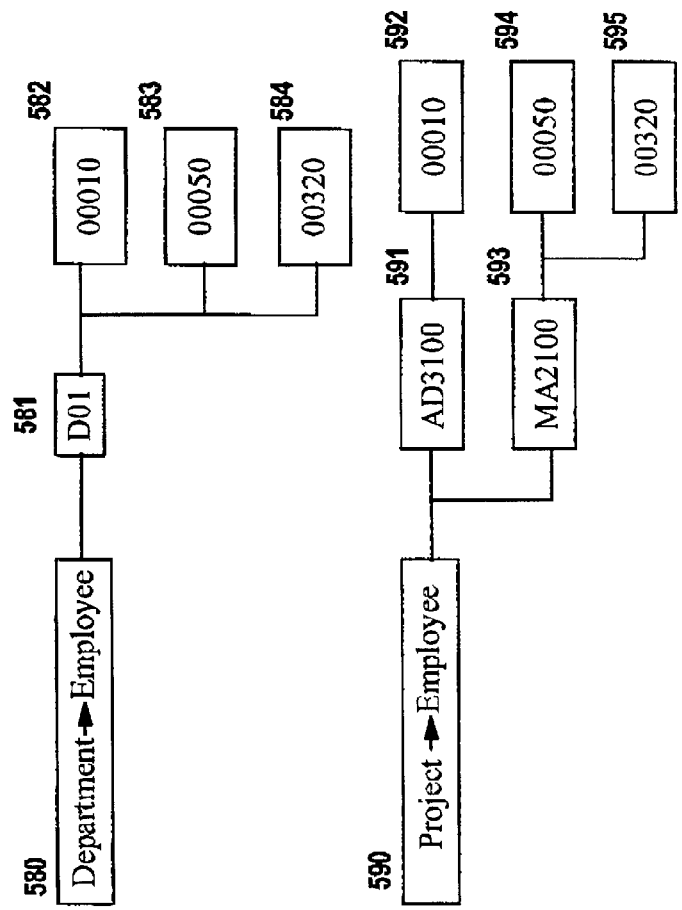

FIG. 5E illustrates a populated association cache. Two associations are represented, that of Department to Employee 580 and that of Project to Employee 590. (The association from Employee to Department, represented by the manager number foreign key 336, has not been shown in FIG. 5E.) These associations correspond to the relationships between the tables (300, 330, 360 of FIG. 3) in the database, and are extracted from the data in the returned rows (FIG. 5A). The owner of an association between Department and Employee is a department, and the members are employees. In this example, a single owner department, D01, was returned from the database, along with three members (the employees having primary keys 00010, 00050, and 00320). Thus the association entry for association 580 has a single owner 581 (identified by its primary key), and three members 582, 583, 584 (also identified by their primary keys). By referring to the rows 301, 302, 304 of FIG. 3A, it can been seen that the owner key value "D01" appears as a foreign key 307 in the database table for each of these members. As discussed earlier with reference to FIG. 4C, this will be true for the owner key in each association entry. For the association between Project and Employee, the owner is a project and the members are employees. This is illustrated by association 590, which has owner r projects AD3100 and MA2100 in this example. The owner key 591 points to one member 592 containing the primary key for employee number 00010, and owner key 593 points to two members 594 and 595 containing the primary keys for employee numbers 00050 and 00320. Employee 00010 has project "AD3100" in foreign key field 308, and employees 00050 and 00320 have project "MA2100" in this field 308, as shown in rows 301, 302, 304 of FIG. 3A. The logic with which these association cache entries are created is explained below with reference to FIG. 6C.

As stated previously in the discussion of FIG. 4C, this novel association cache enables navigation order to be independent from query retrieval order, without requiring an exhaustive search of each returned row looking for specified foreign key values. The advantages of this approach to caching associations will now be demonstrated with reference to the example data in FIG. 3 and the retrieved data in FIG. 5. The Employee table of the present example is related to the Department table and the Project table via foreign keys 307, 308. Thus, an efficient traversal path that begins from the Employee table is already present by directly accessing the database. However, traversing the database to find employee information for a department, or employee information for a project, requires using foreign key searches which are known to be relatively costly operations. Suppose the developer of an application had coded the database retrieval command that retrieved the data in FIG. 5A, which began with Department records, then Employee records, and finally Project records. The resulting set of rows can be efficiently traversed according to this path, without the association cache of the present invention. That is, it is easy to locate all the employees for a department, because the result set will have been returned from the database in that order. Suppose, however, that the task now being performed needs to process data beginning with a project record, locating the employees who work on a particular project (according to the relationship 308). The result set has not been ordered by project number, and thus an exhaustive search of each row will be required when the association cache of the present invention is not used, looking for the project number of interest and then extracting the employee data each time a match is located. The expense of this exhaustive search cannot be avoided by using a database query, because the foreign key retrieval process must be used here also. The association cache of the present invention contains the desired information, however, which is automatically constructed as each row from the result set is processed. By referring to association 590 of FIG. 5E, it can be seen that a look-up table exists for each project number that appeared in the result set: project AD3100 has an index entry at 591, pointing to the single employee number (at 592) which is associated with this project, and project MA2100 has an index entry at 593, pointing to both employees (at 594, 595) which are associated with this project number. Thus, the data corresponding to the result set in FIG. 5A can be efficiently traversed according to the relationship of project to employee. As will be obvious, the data stored at association 580 also enables traversing the data from the result set by department number.

Regardless of the order used to retrieve the result set, the association cache will be created so as to automatically provide an indexed representation of all relationships represented in that result set. Preloading data was briefly mentioned above in the discussion of FIG. 4C. If all employee, department, and project data is preloaded by specifying a query that retrieves all records, then the association cache will provide navigation through this data according to any of the relationships (department to employee 580, project to employee 590, etc.) that are represented in the result set.

The association cache defined by the present invention enables efficient processing of data having complex relationships which it is not possible to describe with a single database query. In a bill-of-materials application, for example, the objects of interest are parts which may consist of other parts. Those parts may further be composed of other parts, to an arbitrary depth of nesting. Attempting to specify the desired data using these relationships with database query commands quickly exceeds the capability of existing query languages. An alternative known in the art is to retrieve each object one at a time, and then issue a subsequent query for its related objects at the next level of nesting. However, this approach requires many roundtrips to the database, resulting in costly data retrieval. Typically the primary keys used for this type of data will be formatted to indicate which parts are subparts of another, by appending characters to the higher-level part number key for each of its subpart keys (such as designating a widget part as item "01", and its subparts as "0101", "0102", etc.). With the association cache defined herein, applications such as bill-of-materials can be efficiently handled by retrieving an appropriate subset of the entire table with a single query that specifies only the topmost component's primary key without any join operations. All rows having this topmost key in their primary key will then be retrieved, as simply a group of rows with no explicit structure of relationships between them. The logic of the preferred embodiment automatically builds the necessary association information about how the objects at one level are composed of (or associated with) objects at the next level, creating a logical tree structure where the topmost component forms the root. These associations are then available for the application to use as it traverses this type of nested object model.

Figure 6A:
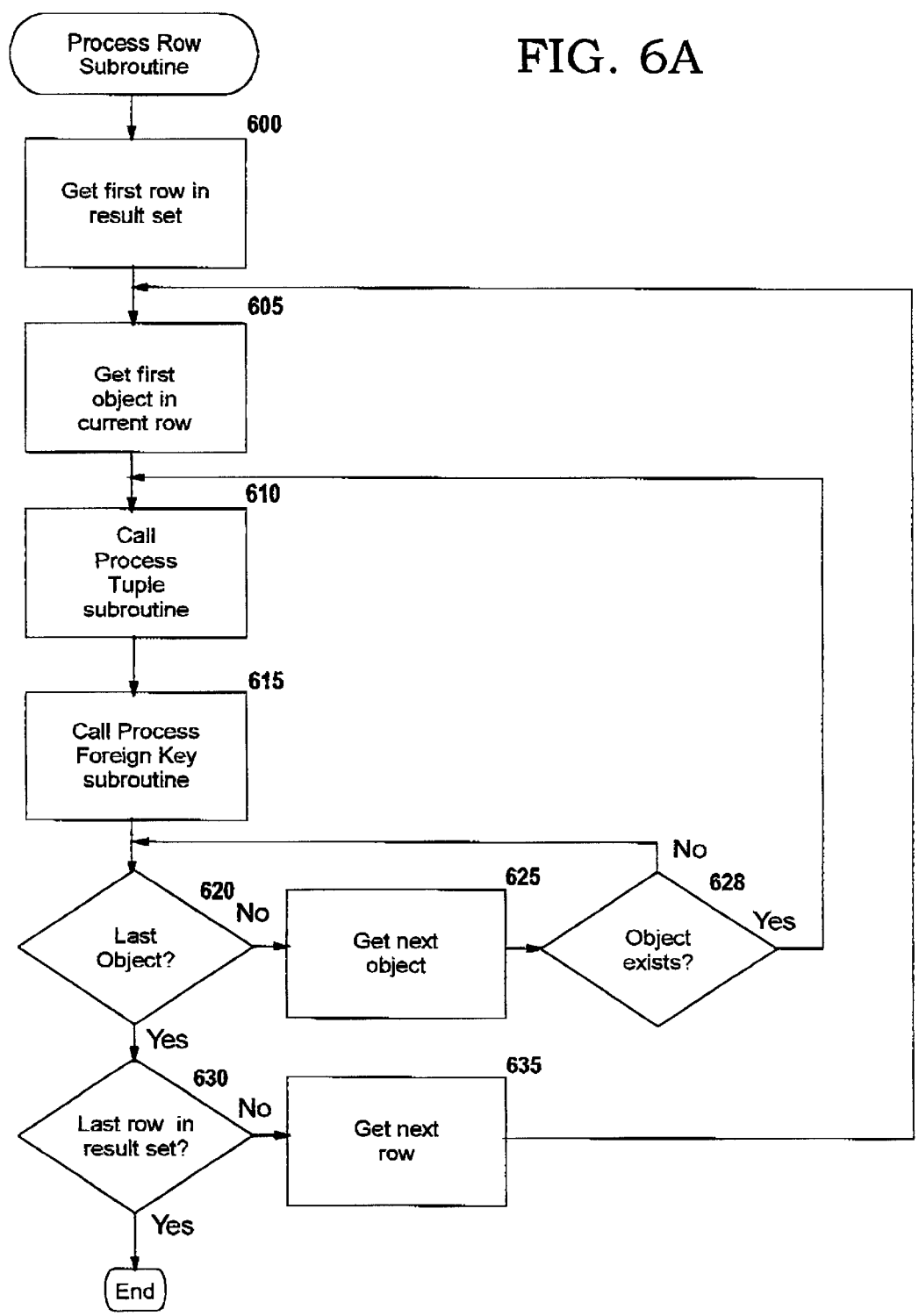
FIGS. 6A–6C provide a flowchart illustrating the process with which each row retrieved from a database query is processed according to a preferred embodiment of the present invention.
Figure 6B:
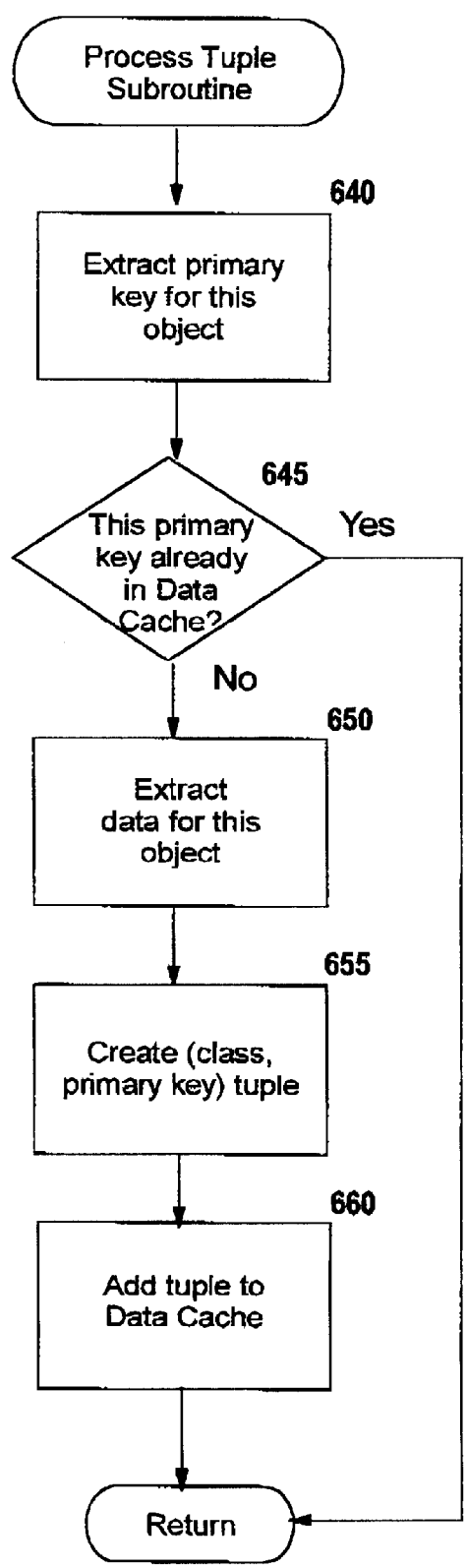
Figure 6C:
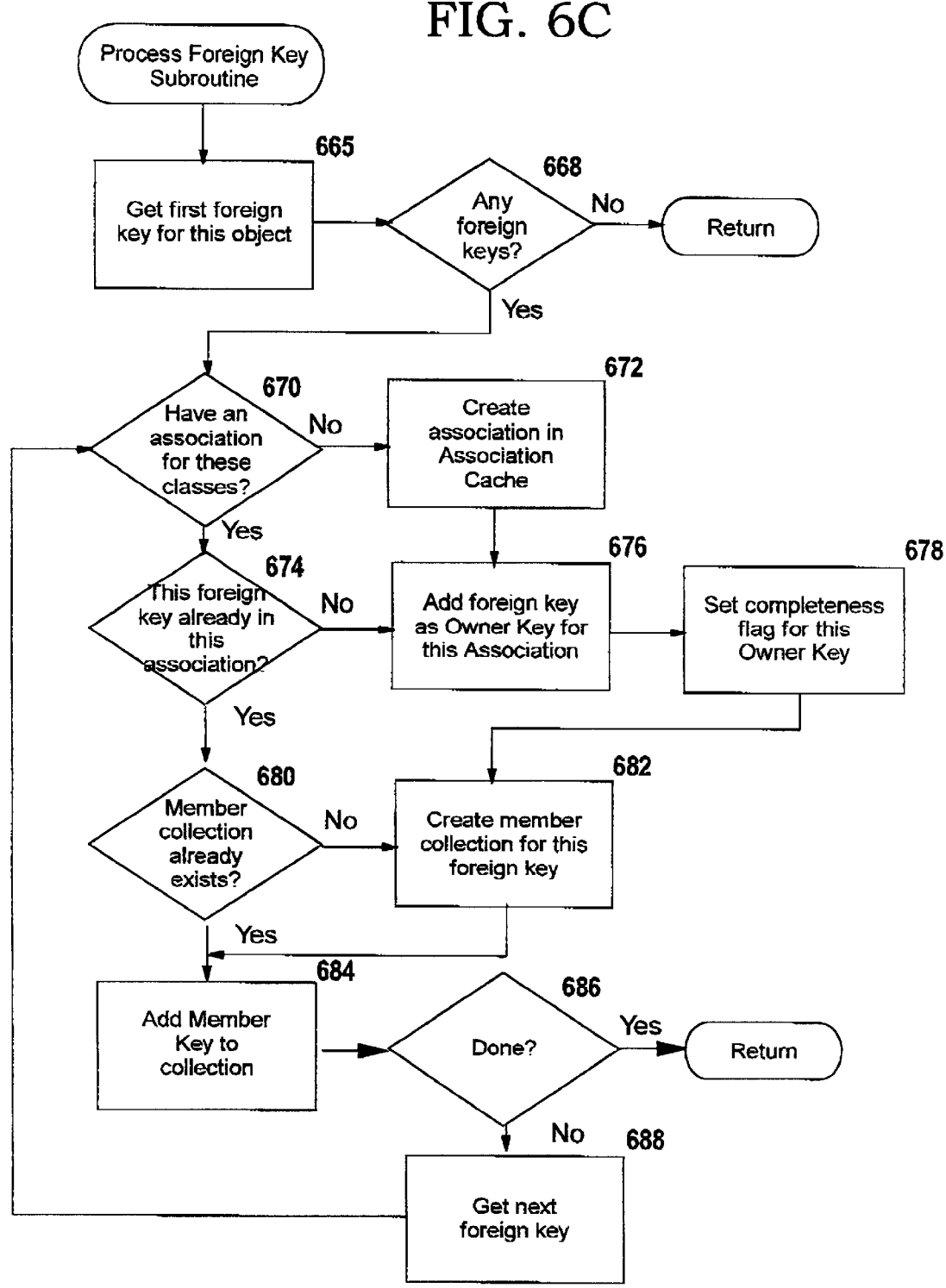
Figure 7:
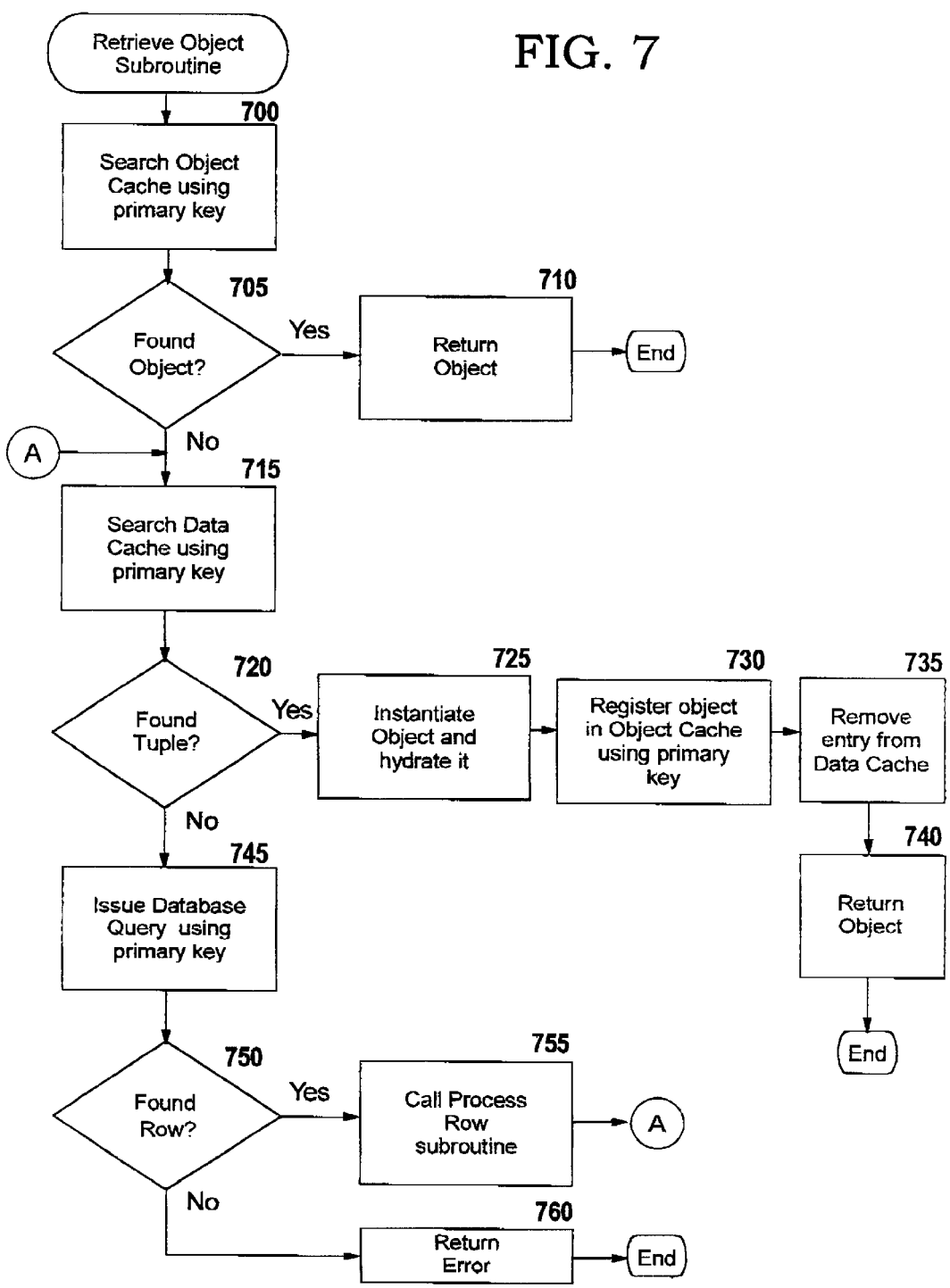
FIG. 7 provides a flowchart illustrating the process with which an object is retrieved according to a preferred embodiment of the present invention.
Figure 8:
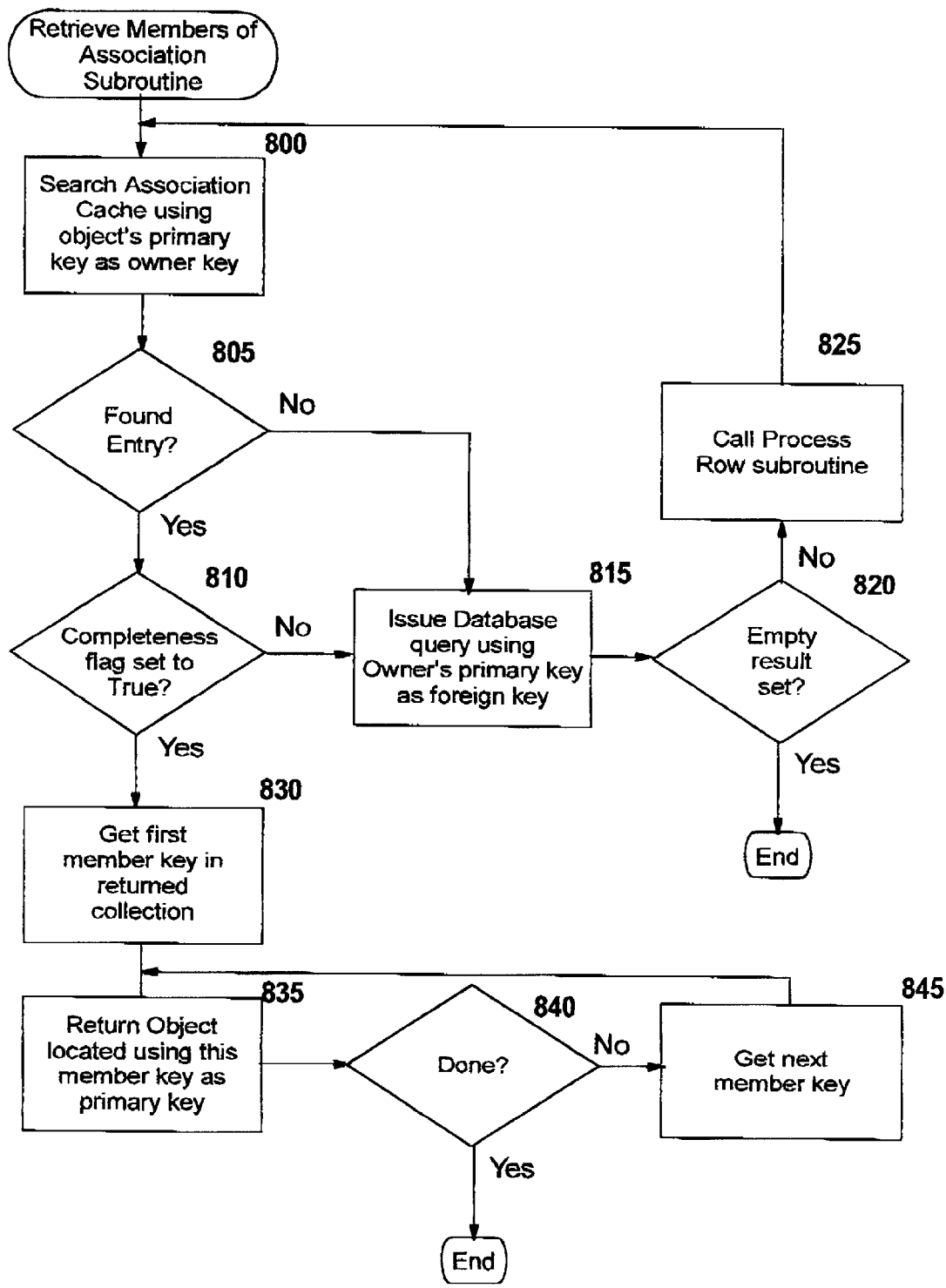
FIG. 8 provides a flowchart illustrating the process used to retrieve the members of an association according to a preferred embodiment of the present invention.

FIGS. 6 through 8 will now be described, showing how the present invention creates a structured cache from the information returned from a database query, and how this structured cache is used to respond to an application's request for access to an object, thereby increasing the efficiency of reading persistent objects from a database.

Read-ahead queries will typically result in rows that contain data for more than one kind of object, as illustrated above using FIG. 5. Therefore each row of a result set (i.e. the returned rows from a database query) needs to be restructured along the object lines in order to be usable with the application's object model. According to the present invention, for each object in the row, the data and the primary key for that object is extracted from the row. The data is converted into a tuple and inserted into the data cache according to the object's class and the primary key. Testing for the existence of the primary key in the data cache before inserting a tuple therein eliminates the redundant entries (such as the two redundant occurrences of information for department D01 in FIG. 5A) in the set that are produced by relational joins, and also saves the processing time that would otherwise be required for extracting the data for the object. FIGS. 6A–6C depict the logic with which the result set is processed, creating a populated structured cache therefrom (as described earlier with reference to the examples in FIGS. 5A through 5D) according to the preferred embodiment.

The process of populating the structured cache begins with the first row from the result set, at Block 600 of FIG. 6A. Each object in the row will be processed according to Blocks 605 through 628, and then this process will be repeated for the next row, until the final row has been processed. The processing for a row begins (Block 605) by locating the first object in the row. The Process Tuple subroutine is called for that object from Block 610, followed by invocation of the Process Foreign Key subroutine at Block 615. These subroutines are described in detail in FIGS. 6B and 6C, respectively. Upon returning from the Process Foreign Key subroutine, Block 620 asks whether this was the last object in the row. If not, Block 625 gets the next object from the row. Block 628 asks if an object exists in this slot. This test will have a negative result when a leaf is missing from the retrieved object tree. For example, if a department row in FIG. 5A was retrieved for an employee that was not assigned to a project, the project slot designated as element 518 would be empty. Block 628 detects this, and transfers control back to Block 620 to see if there are more objects in the row. When Block 628 has a positive result, an object was found in the slot, and control transfers back to Block 610 to begin processing this object. When Block 620 has a positive result, control transfers to Block 630. At Block 630, it is known that there are no more objects in the row. A test is then made to determine whether this was the last row in the result set. If not, Block 635 gets the next row, and control returns back to Block 605 to begin processing the objects in this row. Otherwise, all rows in the result set have been processed, and the processing of FIG. 6A ends.

The Process Tuple subroutine is depicted in FIG. 6B. At Block 640, the primary key for this object is extracted from the data in the returned row. Block 645 then checks to see if an entry for this primary key already exists in the data cache for this object class. If it does, then this tuple contains redundant information produced by a relational join, so the remaining processing of FIG. 6B will be skipped and control will return to the invoking code. Otherwise, control continues to Block 650, where the data for the object having this primary key is extracted from the row. Block 655 then creates a tuple comprising a binary representation of the object class and primary key value. This tuple is inserted into the data cache according to the object's class and primary key at Block 660, and the processing of FIG. 6B then ends.

FIG. 6C depicts the logic of the Process Foreign Key subroutine. Block 665 locates the first foreign key for this object from the data in the returned row. At Block 668, a test is made to determine whether any foreign keys were located in the row. If not, then control returns to the invoking routine. Otherwise, Block 670 then checks to see if an association already exists in the association cache for the association between these classes (that is, the class of the primary key extracted at Block 640 and the class of this foreign key extracted at Block 665). If not, Block 672 creates an association entry for these classes, such as that shown at 580 or 590 in FIG. 5E. When the test in Block 670 has a positive result, Block 674 checks to see if this foreign key is already present in the association cache for this association. Block 676 is reached when the processing of Block 672 completes, and also when Block 674 has a negative result. Block 676 inserts this foreign key into the association cache according to the association and the foreign key, as an owner key for this association. FIG. 5E shows owner key entries at 581, 591, and 593.

Following Block 676, Block 678 sets the "completeness" flag for this owner key. The value of the completeness flag indicates the completeness of the association (i.e. whether all the related primary keys are in the cache), and will have been predetermined by the application developer (based on his knowledge of what will be returned by the query he codes into the application). The completeness flag has the value "TRUE" when any one of the following three conditions is met: (1) a query was issued that explicitly returns all members of a specific association instance, such as 'SELECT*FROM Employee, Department WHERE Department.DeptNo="D01" AND Employee.DeptNo= Department.DeptNo'; (2) a query was issued that returned members for multiple associations; or (3) a query was issued that returns all instances of a class or an inheritance hierarchy. In case (2), some associations may have no members, but will still be marked complete, when it is known that the query retrieved all existing members for the associations. For case (3), all the associations of which the retrieved objects are members will be complete.

If the test in Block 674 had a positive result (i.e. this foreign key exists for this association already), then Block 680 checks to see if a member collection already exists for this foreign key. If the member collection does not yet exist (which will also be the case following Block 678), then one will be created at Block 682. This newly-created member collection will be empty at this point. Following Block 682, and when Block 680 has a positive result, Block 684 adds this member key (which is the primary key of the member object) to the member key collection. Block 686 then tests to see if all foreign keys in this row have been processed. If so, then control returns to the invoking code; otherwise, Block 688 gets the next foreign key, and control returns to Block 670 to begin processing this next foreign key.

The processing of FIG. 6C can be further illustrated by reference to the example in FIG. 5. The logic of Block 676, adding a foreign key as an owner key, corresponds to inserting the foreign key value at 512 (see FIG. 5A) into the association entry 580 for the association between Department and Employee (see FIG. 5E). This foreign key 512 is a department number, and is used as an owner key 581 for the association of all employees in this particular department "D01". The primary key 510 corresponding to owner key 512 identifies a member of this association, which is the employee having employee number "00010". The logic of Block 684 inserts the primary key 510 as member key 582. Block 688 would then locate the next foreign key in the row being processed, which in FIG. 5A is foreign key 514. Foreign key 514 is used with an association between Project and Employee, shown as association 590 of FIG. 5E. This association is processed when control returns from Block 688 to Block 670. On this iteration, Block 676 inserts foreign key 514 as owner key 591, and Block 684 inserts primary key 510 as member key 592.

FIG. 7 depicts the logic with which an object is retrieved according to a preferred embodiment of the present invention. When objects are retrieved, the object cache is searched first, using the requested object's primary key (Block 700). To guarantee uniqueness of the objects within the application's memory, each object that has been instantiated will have been registered into the object cache. If the requested object is found in the object cache (Block 705), then the object is returned to the requesting code (Block 710). Otherwise, the data cache is searched (Block 715) using the primary key of the requested object to search the data cache index for this object's class. If a tuple for this primary key is found in the data cache (Block 720), the object represented by the binary stored data will be instantiated and hydrated (Block 725). This newly-instantiated object is then registered in the object cache (Block 730) according to its object class and primary key. The binary data for this object is then removed from the data cache (Block 735), and the requested object is returned (Block 740). If no tuple for this primary key is found in the data cache (that is, Block 720 has a negative result ), then the data must be retrieved from the database. A database query command is executed using the primary key of the requested object (Block 745). Block 750 tests whether this database query returned any rows. If not, Block 760 returns an error to the invoking code. Otherwise, when one or more rows were returned, Block 755 invokes the Process Row subroutine depicted in FIGS. 6A through 6C. This subroutine invocation loads the returned data into the structured cache, as has been described. In the preferred embodiment, following completion of this subroutine invocation, control returns to Block 715 of FIG. 7 to search the data cache component of the structured cache again for the requested object (which will locate the entry that was placed into the data cache during the just-completed Process Row subroutine).

FIG. 8 depicts the process used to retrieve the members of an association according to a preferred embodiment of the present invention. When members of an association are to be retrieved, the association cache is searched first by locating the entry for a specific owner key for the association (Block 800) using the value of the object's primary key. Block 805 checks to see whether this owner key entry was found. If it was, then Block 810 checks the completeness flag for this owner key to determine whether it is set to TRUE. If the completeness flag is set to FALSE, or if no entry was found (i.e. Block 805 has a negative result), then Block 815 issues a database query to retrieve the members of the association. This query uses the owner's primary key as a foreign key. A test is made at Block 820 to see if the result set returned from the query was empty (that is, it contains no rows). Using the example tables in FIG. 3, suppose the desired association required finding all employees of department number E31. When searching the Employee table 300 using "E31" as a foreign key 307, no rows will be found. When the result set is empty (i.e. Block 820 has a positive result), the processing of FIG. 8 ends; otherwise, Block 825 then invokes the Process Row subroutine to process the rows of the result set. Upon returning from this subroutine invocation, control transfers back to Block 800 to search the association cache component of the structured cache again for the requested association members (which will locate the entries that were placed into the association cache during the just-completed Process Row subroutine).

If the completeness flag for a located owner key entry is TRUE (i.e. Block 810 has a positive result), then Block 830 gets the first member key of the member collection for this owner key. Block 835 locates the member object having this member key by invoking the Retrieve Object subroutine (FIG. 7). Block 840 then asks whether this was the last member key in the collection. If so, the process of FIG. 8 ends; otherwise, Block 845 gets the next member key from the member key collection, and returns control to Block 835 to locate its corresponding object.

The preferred embodiment of the present invention uses a read-only structured cache, storing the working set for a given task, and discards the entries stored therein when the task completes. By discarding a completed task's cached working set and building the next task's working set anew, each cached working set is more likely to accurately represent the objects needed by the current task (and will have fewer entries that are redundant for purposes of the current task, which simply waste storage space). The manner in which the preferred embodiment builds the cache entries operates very quickly and efficiently, and thus the inventors of the present invention believe that the overhead of building the new cache for each new task is justifiable. In addition, this approach of creating and discarding cached data for each individual task eliminates the need to write complicated cache consistency maintenance code that would keep cached values synchronized with the corresponding database values. The advantages in processing efficiency gained from using the preferred embodiment of the present invention are thus increased further. However, an alternative embodiment of the present invention may also be used advantageously, where the cached data is not discarded when a task completes but instead is treated as a global cache to be used for execution of multiple tasks (including using the cache for execution of an entire application). Whether this alternative embodiment is feasible depends on the working set characteristics of a particular application. Cache consistency maintenance may be required when using this alternative, if the persistent values in the database are being changed while corresponding entries are present in the structured cache. Such maintenance procedures are known in the art, and may be added to an application using the present invention without undue experimentation. For example, when a database update operation has been performed by logic coded in the application, code should also be added that will use the key values of the updated object(s) to search each component of the structured cache: for each occurrence located in the cache, the corresponding entry and its data should be removed. If this data is subsequently needed by the application, it will be efficiently retrieved from the database (thereby obtaining the updated values) and reloaded into the cache without change to the logic of FIGS. 6 through 8.

The discussions of persistent store herein are in terms of using a "database". However, it is to be understood that this is for ease of reference. Any type of persistent store, however organized (such as a file system), may be used without deviating from the inventive concepts disclosed herein.

While the present invention has been described relative to retrieving persistent data from a relational database using Java programming, the basic techniques described herein may be applicable to many types of programming languages and many types of databases. Thus, while the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and such modifications as fall within the spirit and scope of the invention.

We claim:

1. Computer readable code for increasing efficiency of reading persistent objects from a database by creating and using a structured cache in a computer system, comprising:

a subprocess for retrieving a result set from said database in response to a database query, said result set comprising one or more rows of data elements;

a subprocess for creating a data cache from said retrieved result set; and a subprocess for creating an associations cache from said retrieved result set.

2. Computer readable code for increasing efficiency of reading persistent objects from a database by creating and using a structured cache in a computer system, comprising:

a subprocess for retrieving a result set from said database in response to a database query, said result set comprising one or more rows of data elements;

a subprocess for creating a data cache from said retrieved result set; and a subprocess for responding to a request for access to an object by an executing program in said computer system, comprising:

a subprocess for locating an entry corresponding to said object in said data cache;

a subprocess for instantiating and hydrating said object from said located entry;

a subprocess for registering said instantiated and hydrated object in an object cache; and a subprocess for returning said instantiated and hydrated object to said executing program.

3. Computer readable code according to claim 2, further comprising a subprocess for creating an associations cache from said retrieved result set.

4. Computer readable code according to claim 2, wherein said subprocess for responding to a request for access operates only for an initial request for access to said object; and further comprising a subprocess for responding to subsequent requests for access to said object, said subprocess comprising:

a subprocess for locating said requested object in said object cache using said register; and a subprocess for returning said located object to said executing program.

5. Computer readable code for increasing efficiency of reading persistent objects from a database by creating and using a structured cache in a computer system, comprising:

a subprocess for retrieving a result set from said database in response to a database query, said result set comprising one or more rows of data elements;

a subprocess for creating a data cache from said retrieved result set; and a subprocess for creating an object cache entry for an object corresponding to data stored in said data cache, comprising:

a subprocess for locating an entry corresponding to said stored data in said data cache;

a subprocess for instantiating and hydrating said object from said located entry; and a subprocess for registering said instantiated and hydrated object in said object cache by creating said object cache entry.

6. Computer readable code according to claim 5, further comprising a subprocess for creating an associations cache from said retrieved result set.

7. Computer readable code according to claim 5, further comprising a subprocess for retrieving a selected object from said structured cache, wherein said subprocess for retrieving further comprises:

a subprocess for searching said object cache for said selected object using a result of said subprocess for registering;

a subprocess for returning said selected object if said subprocess for searching said object cache locates said selected object;

a subprocess for searching said data cache for said entry corresponding to said selected object if said subprocess for searching said object cache fails to locate said selected object;

wherein said subprocess for creating an object cache entry is invoked if said subprocess for searching said data cache locates said entry; and a subprocess for issuing a further database query if said subprocess for searching said data cache fails to locate said entry.

8. Computer readable code according to claim 6, further comprising a subprocess for navigating associations represented by said result set using said associations cache, in response to a request for one or more member objects of a selected association, comprising:

a subprocess for searching said associations cache to locate a member key collection corresponding to said selected association, said member key collection comprised of one or more member primary keys;

a subprocess for retrieving said member key collection from said database by issuing a second database query if said subprocess for searching fails to locate said member key collection in said associations cache;

a subprocess for locating each member object associated with said member key collection in said associations cache if said subprocess for searching locates said member key collection; and a subprocess for returning said located member objects as a response to said first request.

9. Computer readable code according to claim 5, wherein said subprocess for creating a data cache further comprises:

a subprocess for extracting a primary key for each object in each row of said result set;

a subprocess for extracting corresponding data for each object from said row if said primary key does not already exist in said data cache; and a subprocess for storing said extracted primary key and said extracted corresponding data as said entry corresponding to said object in said data cache.

10. Computer readable code according to claim 9, wherein access to said data cache uses a data cache look-up table, and wherein said data cache look-up table is comprised of a collection of said stored primary keys and, for each of said stored primary keys, a corresponding pointer to said stored extracted corresponding data.

11. Computer readable code according to claim 6, wherein said subprocess for creating an associations cache further comprises:

a subprocess for defining one or more association types for said associations cache;

a subprocess for storing association cache entries corresponding to said defined association types; and a subprocess for populating said associations cache, said subprocess for populating further comprising:

a subprocess for extracting zero or more foreign keys for each object in each row of said result set;

a subprocess for storing each extracted foreign key as an owner key, said owner key being associated with a particular one of said stored association cache entries and being unique within said particular one; and a subprocess for storing a member primary key corresponding to each extracted foreign key, said member primary key being associated with a particular one of said stored owner keys.

12. Computer readable code according to claim 11, wherein access to said associations cache uses an associations cache look-up table, and wherein said associations cache look-up table is comprised of a collection of said stored association cache entries, said stored owner keys, and said stored member primary keys, organized according to said stored member primary keys within said stored owner keys within said stored association cache entries.

13. Computer readable code according to claim 5, wherein access to said object cache uses an object cache look-up table, wherein said object cache look-up table is comprised of a collection of object identifiers, one of said object identifiers corresponding to each of said registered objects, and wherein said object cache look-up table is organized according to said object identifiers.

14. Computer readable code for enabling object navigation to be independent of a data access path used on a query that retrieves data from a database, comprising:

a subprocess for creating an associations cache, wherein said associations cache comprises an entry for each association in said retrieved data; and a subprocess for retrieving one or more member objects of a selected one of said associations from said created associations cache.

15. A system for creating and using a structured cache to increase the efficiency of reading persistent objects from a database in a computing environment, comprising:

means for retrieving a result set from said database in response to a database query, said result set comprising one or more rows of data elements;

means for creating a data cache from said retrieved result set; and means for responding to a request for access to an object by an executing program in said computer system, comprising:

means for locating an entry corresponding to said object in said data cache;

means for instantiating and hydrating said object from said located entry;

means for registering said instantiated and hydrated object in an object cache; and means for returning said instantiated and hydrated object to said executing program.

16. The system according to claim 15, further comprising means for creating an associations cache from said retrieved result set.

17. The system according to claim 15, wherein said means for responding to a request for access operates only for an initial request for access to said object; and further comprising means for responding to subsequent requests for access to said object, said means comprising:

means for locating said requested object in said object cache using said register; and means for returning said located object to said executing program.

18. A system for creating and using a structured cache to increase the efficiency of reading persistent objects from a database in a computing environment, comprising:

means for retrieving a result set from said database in response to a database query, said result set comprising one or more rows of data elements;

means for creating a data cache from said retrieved result set; and means for creating an object cache entry for an object corresponding to data stored in said data cache, comprising:

means for locating an entry corresponding to said stored data in said data cache;

means for instantiating and hydrating said object from said located entry; and means for registering said instantiated and hydrated object in said object cache by creating said object cache entry.

19. The system according to claim 18, further comprising means for creating an associations cache from said retrieved result set.

20. The system according to claim 18, further comprising means for retrieving a selected object from said structured cache, wherein said means for retrieving further comprises:

means for searching said object cache for said selected object using a result of said means for registering;

means for returning said selected object if said means for searching said object cache locates said selected object;

means for searching said data cache for said entry corresponding to said selected object if said means for searching said object cache fails to locate said selected object;

wherein said means for creating an object cache entry is invoked if said means for searching said data cache locates said entry; and means for issuing a further database query if said means for searching said data cache fails to locate said entry.

21. The system according to claim 19, further comprising means for navigating associations represented by said result set using said associations cache, in response to a request for one or more member objects of a selected association, comprising:

means for searching said associations cache to locate a member key collection corresponding to said selected association, said member key collection comprised of one or more member primary keys;

means for retrieving said member key collection from said database by issuing a second database query if said means for searching fails to locate said member key collection in said associations cache;

means for locating each member object associated with said member key collection in said associations cache if said means for searching locates said member key collection; and means for returning said located member objects as a response to said first request.

22. The system according to claim 18, wherein said means for creating a data cache further comprises:

means for extracting a primary key for each object in each row of said result set;

means for extracting corresponding data for each object from said row if said primary key does not already exist in said data cache; and means for storing said extracted primary key and said extracted corresponding data as said entry corresponding to said object in said data cache.

23. The system according to claim 19, wherein said means for creating an associations cache further comprises:

means for defining one or more association types for said associations cache;

means for storing association cache entries corresponding to said defined association types; and means for populating said associations cache, said means for populating further comprising:

means for extracting zero or more foreign keys for each object in each row of said result set;

means for storing each extracted foreign key as an owner key, said owner key being associated with a particular one of said stored association cache entries and being unique within said particular one; and means for storing a member primary key corresponding to each extracted foreign key, said member primary key being associated with a particular one of said stored owner keys.

24. A system for enabling object navigation to be independent of a data access path used on a query that retrieves data from a database in a computing environment, comprising:

means for creating an associations cache, wherein said associations cache comprises an entry for each association in said retrieved data; and means for retrieving one or more member objects of a selected one of said associations from said created associations cache.

25. A method for creating and using a structured cache to increase the efficiency of reading persistent objects from a database in a computing environment, comprising the steps of:

retrieving a result set from said database in response to a database query, said result set comprising one or more rows of data elements;

creating a data cache from said retrieved result set; and responding to a request for access to an object by an executing program in said computer system, comprising the steps of:

locating an entry corresponding to said object in said data cache;

instantiating and hydrating said object from said located entry;

registering said instantiated and hydrated object in an object cache; and returning said instantiated and hydrated object to said executing program.

26. The method according to claim 25, further comprising the step of creating an associations cache from said retrieved result set.

27. The method according to claim 25, wherein said step for responding to a request for access operates only for an initial request for access to said object; and further comprising the step of responding to subsequent requests for access to said object, said step of responding comprising the steps of:

locating said requested object in said object cache using said register; and returning said located object to said executing program.

28. A method for creating and using a structured cache to increase the efficiency of reading persistent objects from a database in a computing environment, comprising the steps of:

retrieving a result set from said database in response to a database query, said result set comprising one or more rows of data elements;

creating a data cache from said retrieved result set; and creating an object cache entry for an object corresponding to data stored in said data cache, comprising the steps of:

locating an entry corresponding to said stored data in said data cache;

instantiating and hydrating said object from said located entry; and registering said instantiated and hydrated object in said object cache by creating said object cache entry.

29. The method according to claim 28, further comprising the step of creating an associations cache from said retrieved result set.

30. The method according to claim 28, further comprising the step of retrieving a selected object from said structured cache, wherein said step of retrieving further comprises the steps of:

searching said object cache for said selected object using a result of said step of registering;

returning said selected object if said step of searching said object cache locates said selected object;

searching said data cache for said entry corresponding to said selected object if said step of searching said object cache fails to locate said selected object;

wherein said step of creating an object cache entry is invoked if said step of searching said data cache locates said entry; and issuing a further database query if said step of searching said data cache fails to locate said entry.

31. The method according to claim 29, further comprising the step of navigating associations represented by said result set using said associations cache, in response to a request for one or more member objects of a selected association, comprising the steps of:

searching said associations cache to locate a member key collection corresponding to said selected association, said member key collection comprised of one or more member primary keys;

retrieving said member key collection from said database by issuing a second database query if said step of searching fails to locate said member key collection in said associations cache;

locating each member object associated with said member key collection in said associations cache if said step of searching locates said member key collection; and returning said located member objects as a response to said first request.

32. The method according to claim 28, wherein said step of creating a data cache further comprises the steps of:

extracting a primary key for each object in each row of said result set; extracting corresponding data for each object from said row if said primary key does not already exist in said data cache; and storing said extracted primary key and said extracted corresponding data as said entry corresponding to said object in said data cache.

33. The method according to claim 29, wherein said step of creating an associations cache further comprises the steps of:

defining one or more association types for said associations cache;

storing association cache entries corresponding to said defined association types; and populating said associations cache, said step of populating further comprising the steps of:

extracting zero or more foreign keys for each object in each row of said result set;

storing each extracted foreign key as an owner key, said owner key being associated with a particular one of said stored association cache entries and being unique within said particular one; and storing a member primary key corresponding to each extracted foreign key, said member primary key being associated with a particular one of said stored owner keys.

34. A method for enabling object navigation to be independent of a data access path used on a query that retrieves data from a database in a computing environment, comprising the steps of:

creating an associations cache, wherein said associations cache comprises an entry for each association in said retrieved data; and retrieving one or more member objects of a selected one of said associations from said created associations cache.

* * * * *